(12) United States Patent
Symko et al.

(10) Patent No.: US 8,143,767 B2
(45) Date of Patent: Mar. 27, 2012

(54) COMPACT THERMOACOUSTIC ARRAY ENERGY CONVERTER

(75) Inventors: Orest G. Symko, Salt Lake City, UT (US); Young S. Kwon, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 13/183,927

(22) Filed: Jul. 15, 2011

(65) Prior Publication Data

US 2012/0007369 A1    Jan. 12, 2012

Related U.S. Application Data

(63) Continuation of application No. 12/018,762, filed on Jan. 23, 2008, now Pat. No. 8,004,156.

(51) Int. Cl.
*H02N 2/18* (2006.01)

(52) U.S. Cl. .................................. 310/339; 310/334

(58) Field of Classification Search .............. 310/339, 310/334
See application file for complete search history.

(56) References Cited

U.S. PATENT DOCUMENTS

| | | | |
|---|---|---|---|
| 4,067,956 A | 1/1978 | Franklin et al. |
| 4,124,691 A | 11/1978 | Geen et al. |
| 4,398,398 A | 8/1983 | Wheatley et al. |
| 4,489,553 A | 12/1984 | Wheatley et al. |
| 4,584,840 A | 4/1986 | Baumann |
| 4,953,366 A | 9/1990 | Swift et al. |
| 5,165,243 A | 11/1992 | Bennett |
| 5,266,961 A | 11/1993 | Milroy |
| 5,303,555 A | 4/1994 | Chrysler et al. |
| 5,339,640 A | 8/1994 | Reinke |
| 5,349,363 A | 9/1994 | Milroy |
| 5,361,076 A | 11/1994 | Milroy |
| 5,369,625 A | 11/1994 | Gabrielson |
| 5,412,394 A | 5/1995 | Milroy |
| 5,456,082 A | 10/1995 | Keolian et al. |
| 5,469,165 A | 11/1995 | Milroy |
| 5,483,248 A | 1/1996 | Milroy |

(Continued)

FOREIGN PATENT DOCUMENTS

WO    03004946    1/2003

(Continued)

OTHER PUBLICATIONS

International Search Report for Application No. PCT/US2009/000427 dated Mar. 16, 2009 (2 pages).

(Continued)

*Primary Examiner* — Walter Benson
*Assistant Examiner* — Bryan Gordon
(74) *Attorney, Agent, or Firm* — Michael Best & Friedrich LLP

(57) ABSTRACT

A thermoacoustic array energy converter consists of heat driven thermoacoustic prime movers in parallel coupled by means of an acoustic cavity to a piezoelectric electrical generator whose output is rectified and fed to an energy storage element. The prime movers convert heat to sound in a resonator. The sound form a phase-locked array is converted to electricity by means of the piezoelectric element. The generated electric energy is converted to DC by means of a rectifier set and it is then stored in a battery or supercapacitor. The generated electric energy can also be converted to power line frequency.

19 Claims, 3 Drawing Sheets

U.S. PATENT DOCUMENTS

| | | | |
|---|---|---|---|
| 5,485,165 A | 1/1996 | Foard | |
| 5,561,984 A | 10/1996 | Godshalk et al. | |
| 5,583,524 A | 12/1996 | Milroy | |
| 5,604,505 A | 2/1997 | Matterer | |
| 5,647,216 A | 7/1997 | Garrett | |
| 5,673,561 A | 10/1997 | Moss | |
| 5,771,567 A | 6/1998 | Pierce et al. | |
| 5,813,234 A | 9/1998 | Wighard | |
| 5,857,319 A | 1/1999 | Sattelmayer | |
| 5,857,340 A | 1/1999 | Garrett | |
| 5,865,167 A | 2/1999 | Godik | |
| 5,892,293 A * | 4/1999 | Lucas | 290/1 R |
| 5,901,556 A | 5/1999 | Hofler | |
| 5,953,921 A | 9/1999 | Garrett | |
| 5,996,345 A | 12/1999 | Hofler | |
| 6,032,464 A | 3/2000 | Swift et al. | |
| 6,164,073 A | 12/2000 | Swift et al. | |
| 6,225,746 B1 | 5/2001 | Wickramanayaka | |
| 6,314,740 B1 | 11/2001 | De Blok et al. | |
| 6,385,972 B1 | 5/2002 | Fellows | |
| 6,574,968 B1 | 6/2003 | Symko et al. | |
| 6,591,610 B2 * | 7/2003 | Yazawa et al. | 60/527 |
| 6,804,967 B2 | 10/2004 | Symko et al. | |
| 7,240,495 B2 * | 7/2007 | Symko et al. | 62/6 |
| 8,004,156 B2 | 8/2011 | Symko et al. | |
| 2004/0000150 A1 * | 1/2004 | Symko et al. | 62/6 |
| 2004/0231341 A1 | 11/2004 | Smith | |
| 2006/0037812 A1 * | 2/2006 | Kawahashi et al. | 181/262 |
| 2006/0119224 A1 | 6/2006 | Keolian et al. | |
| 2006/0225435 A1 | 10/2006 | Arman et al. | |
| 2007/0235252 A1 * | 10/2007 | Hossain | 181/262 |
| 2007/0284014 A1 | 12/2007 | Shin | |

FOREIGN PATENT DOCUMENTS

| | | |
|---|---|---|
| WO | 03049491 | 6/2003 |
| WO | 2009094175 | 7/2009 |

OTHER PUBLICATIONS

International Preliminary Examination Report for Application No. PCT/US2009/000427 dated Aug. 5, 2010 (6 pages).

"Reticulated Vitreous Carbon: A New Form of Carbon." ERG: Materials and Aerospace Corporation, Oakland, CA, 1976 (4 pages).

* cited by examiner

COMPACT THERMOACOUSTIC ARRAY ENERGY CONVERTER

CROSS-REFERENCE TO RELATED APPLICATIONS

This application is a continuation of U.S. application Ser. No. 12/018,762, filed Jan. 23, 2008, the content of which is incorporated herein by reference in its entirety.

GOVERNMENT RIGHTS

This invention was made with government support under N0001403-1-1-0543 awarded by the Office of Naval Research. The Government has certain rights to this invention.

TECHNICAL FIELD

The present invention relates generally to systems and methods for the generation of electricity in the conversion of heat to sound in a resonator. More particularly, the present invention relates to systems and methods for directly generating electricity in the conversion of heat to sound in a miniaturized device which is compact light, and capable of handling high power densities.

BACKGROUND

The concept of converting heat to sound has been known for over two hundred years. For example, in the "singing pipe," heat is applied to a closed end of a resonant tube having a metal mesh within the tube which has a "hot" end near the heated end of the resonant tube and a "cold" end further from the heat source. The terms "hot" and "cold" refer to their relative temperatures with respect to each other. The "hot" end could be at room temperature with the important parameter not being the actual temperature, but the temperature gradient.

An acoustical standing wave set up in the resonator tube forces a working fluid (e.g., a gas) within the resonator to undergo a cycle of compression, heating, expansion, and cooling. In this case, thermal energy is converted into acoustical energy and it maintains the standing waves.

The work of converting heat to sound has been moved forward through the development of thermoacoustical refrigerators, as disclosed in U.S. Pat. No. 6,574,968, entitled HIGH FREQUENCY THERMOACOUSTIC REFRIGERATOR, which is incorporated herein by reference. Essentially, the conversion of heat to electricity by the present invention can be thought of as the opposite process performed by the thermoacoustic refrigerator. Thus, instead of applying energy to a piezoelectric element to thereby cool a device, energy is being taken and converted from a heat source itself.

Early attempts to create a thermoacoustic energy converter have failed for various reasons. For example, the process was performed in prior art devices operating at around 100 Hz which would convert the low frequency sound to electricity. However, the process was abandoned by those skilled in the art because of the very low efficiency of the energy conversion process at low frequencies.

One prior art process for direct conversion of heat to electricity utilizes a permanent magnet and a moving coil. This process is costly because of the magnet. It is also bulky and heavy and the efficiency decreases as the frequency of the device increases, making high frequency operation impractical. The device itself can also cause magnetic interference with nearby magnetically sensitive devices, precluding use in certain environments.

In order to make a thermoacoustic energy conversion process practical, it may be desirable to operate the device at high frequencies. High frequencies can result in more efficient operation of an electro-mechanical transducer, such as a piezoelectric element that is to be used in the present invention for the conversion of sound energy to electricity.

Another advantage of operation at high frequencies comes from a comparison with prior art thermoacoustic devices that are relatively large compared to semiconductor devices and biological samples. Thus, it would be another advantage to make the thermoacoustic energy converter small enough to be operable with such devices and samples.

Attempts to address the shortcomings of the prior art have resulted in devices, such as that disclosed in the published International Patent Application entitled High Frequency Thermoacoustic Energy Converter, International Publication Number WO 03/049491, which is incorporated by reference herein in its entirety. Such devices addressed the problems with other prior art devices by using a resonator that also functions as a housing for an electro-mechanical transducer, a stack formed from random fibers comprised of a material having poor thermal conductivity and a pair of heat exchangers comprised of a material having good thermal conductivity positioned on opposite sides of the stack. However, positive feedback across the system was less than desired and electrical generation was thus reduced.

Electronic devices and machinery produce waste heat which limits their performance and efficiency. Thermal management of such heat and its conversion to electrical power would raise their output and at the same time provide an important source of renewable energy. Achieving such goals with simple, efficient and high power density devices would assist in providing a solution to current energy problems. The effectiveness of such an approach will be determined by the nature of the devices, on their ability to cope with a wide range of heat inputs from waste heat, and on their impact on the environment.

Problems that need to be solved deal with device interfacing to the source of waste heat and device scaling to a wide range of heat sources including compact electronics. Moreover with escalating power levels in waste heat, it is important for the devices to be high power density units in order to cope with high power level demands. Thus, there is an ever-increasing need for more energy to be reduced by providing renewable energy from waste heat. As there is an abundance of such waste heat, an efficient technology is needed for converting the waste heat to electricity. Such a technology would be capable of interfacing with sources of waste heat, would have an extended life and would be relatively inexpensive to manufacture and implement. A system or method capable of addressing these issues and of handling the dual function of energy conversion and thermal management for a wide range of applications would be an improvement in the art.

SUMMARY

A thermoacoustic device includes a compact resonant system which converts heat to sound in a resonator and which transforms the sound directly to electricity at levels which can be used to power other electrical systems. Heat applied to one end of the resonator sets up a sound wave which is coupled by means of a cavity to a sound-to-electricity converter, such as a piezoelectric monomorph energy converter. The electrical energy at audio or ultrasonic frequencies is rectified for storage through electrical circuitry and components. In order to increase the energy level and thus the production of electricity derived from a heat source, a plurality of thermoacoustic devices are used. The thermoacoustic devices are phase-locked by the cavity and are coupled to a single sound-to-energy converter. The cavity reduces temperature difference for the onset of oscillations in each thermoacoustic device and to phase-lock them for maximum energy output. A low onset diode full-wave rectifier set is employed with the piezoelectric device to provide a DC output for energy storage on a battery or a supercapacitor.

Injected heat generates sound in each acoustic resonator of the array of thermoacoustic devices, which is then coupled to a sound chamber. The sound in the chamber is converted to electricity by means of a sound-to-electricity converter (i.e., the energy converter). The chamber allows for sustained acoustic oscillations in the resonator with additional positive feedback provided by the cavity coupled to each resonator. It also phase-locks each thermoacoustic device to provide coherence between each of the acoustic devices for maximum energy output. The sound-to-electricity converter directly coupled to the chamber to generate maximum electrical power from heat-generated sound. Such devices, while useful as energy converters, may also provide thermal management in a variety of large and small systems that produce waste heat in operation.

in accordance with one aspect of the present invention, heat from a heat source or waste heat is coupled by a thermal conductor to the hot side of each thermoacoustic device. Each thermoacoustic device is coupled to an in fluid communication with a sound chamber.

In accordance with another aspect of the present invention, the energy converter is positioned at a distal end of the sound chamber.

In accordance with yet another aspect of the present invention, the energy converter is in resonance with the acoustic devices, leading to maximum electrical energy output by the energy converter.

In accordance with still another aspect of the present invention, a single energy converter in the form of a piezoelectric element is used to collect acoustic energy form multiple acoustic units, thus providing considerable reduction the volume of the energy conversion system of the present invention.

In accordance with another aspect of the present invention, audio or ultrasonic frequency energy is changed to DC electricity by means of an efficient rectifier and stored in a battery or a supercapacitor.

In accordance with yet another aspect of the present invention, the storage of electrical energy in a supercapacitor provides a system with long cycle lives and overall superior performance to energy storage in a battery.

In accordance with still another aspect of the present invention, the energy conversion system of the present invention is provided in a portable device.

In accordance with another aspect of the present invention, the plurality of thermoacoustic units form a large array operating in the ultrasonic range.

Methods of utilizing such devices, particularly in arrays to capture waste heat from electronic devices or machinery are also included in the present invention, as are methods of creating such devices.

DESCRIPTION OF THE DRAWINGS

It will be appreciated by those of ordinary skill in the art that the various drawings are for illustrative purposes only. The nature of the present invention, as well as other embodiments of the present invention, may be more clearly understood by reference to the following detailed description of the invention, to the appended claims, to the appendix attached hereto, and to the several drawings.

DETAILED DESCRIPTION OF THE ILLUSTRATED EMBODIMENTS

Figure 1:
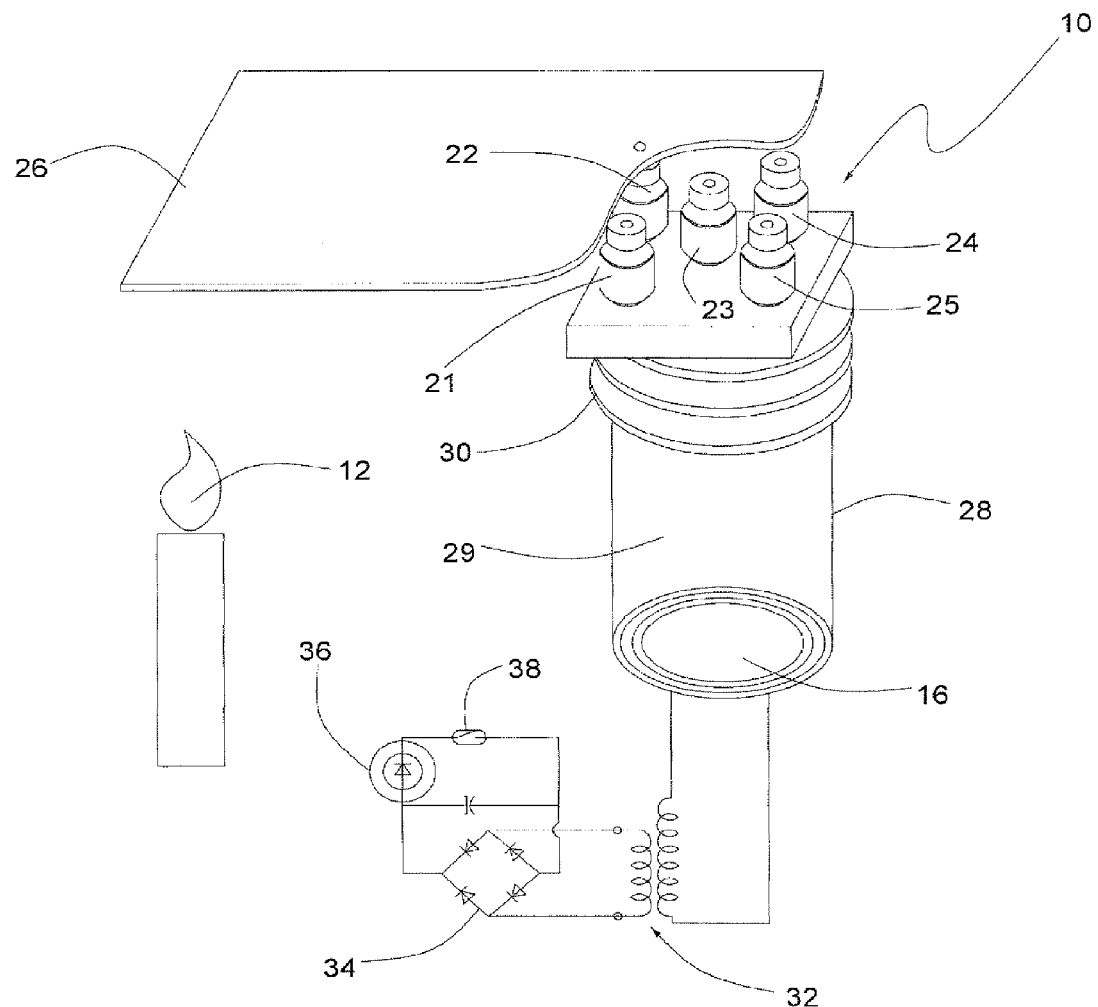
FIG. 1 is a perspective top view of the structural components and a schematic representation of the electrical circuitry of one illustrative embodiment of a thermoacoustic energy converter in accordance with the principles of the present invention.

The present invention relates to systems and methods related to thermoacoustic devices. It will be appreciated by those skilled in the art that the embodiments herein described, while illustrating certain embodiments, are not intended to so limit the invention or the scope of the appended claims. Those skilled in the art will also understand that various combinations or modifications of the embodiments presented herein can be made without departing from the scope of the invention. All such alternate embodiments are within the scope of the present invention. Similarly, while the drawings depict illustrative embodiments of the devices and components in accordance with the present invention and illustrate the principles upon which the device is based, they are only illustrative and any modification of the invented features presented here are to be considered within the scope of this invention.

In view of the demands for thermal management and for energy conversion from heat to electricity, an efficient and compact unit, based on thermaoacoustics, was developed. In such a device, where heat produces sound and in the same unit the sound is directly converted to electricity, a resonant acoustic system, heat exchangers, a stack of fibrous material, an acoustic cavity, and an electrical generator are provided.

In a typical arrangement, the stack may be located about halfway in the resonator with the heat exchangers at each end of the stack. Heat is injected to the closed end of the resonator, near or at the hot heat exchanger. The other end of the resonator is maintained at a fixed lower temperature by means of heat sinks or heat fins. Such configuration creates a temperature difference and hence a temperature gradient along the stack. Above a threshold temperature difference acoustic oscillations are set up in the resonator. The frequency of heat-generated acoustic oscillations is determined by the resonator and its size. By attaching an acoustic cavity to the open end of the resonator, the threshold of onset for oscillations is reduced substantially. The sound to electricity generator may be located inside the device at the closed end of the cavity. The electrical generator may be a piezoelectric element in the monomorph or bimorph configuration.

In one embodiment of the present invention, the closed end of the cavity may contain the electric generator. In other embodiments, it may be located at the closed end of the resonator. However, at such location it could be affected by heat injected into the device.

In accordance with another aspect of the present invention, the heat source energy can be coupled to the device by thermal conduction or it can be a source of energy such as a flame with directed heating or radio-isotope.

In accordance with another aspect of the present invention, the thermal mass of the heated side of the resonator should be much less than the thermal mass of the fixed low temperature end of the resonator.

In accordance with another aspect of the present invention, an acoustic cavity is attached to a resonator in order to lower the temperature difference across the stack for onset of oscillations.

In accordance with another aspect of the present invention, the internal diameter of the resonator is kept large even though devices are miniaturized. In that case initiation of oscillation is promoted by acoustic cavity. A large resonator diameter leads to large acoustic power density. In accordance with another aspect of the present invention, miniaturized devices lead to array configuration.

FIG. 1 shows a thermoacoustic electrical generation system 10 where heat energy 12, represented by a candle flame, is converted to sound and also directly to electricity in a compact unit in accordance with the present invention. The heat 12 is converted to electricity which is then stored in a supercapacitor 14. The system 10 can be used to generate electricity and/or to thermally manage a device or machine which produces excess heat by converting the heat to sound. Such a system 10 can be used in large or small systems where waste heat 12 is generated and it can also be used as a source of electrical power. The energy converter 10 is comprised of a plurality of thermoacoustic devices 21-25 that are coupled at a first end to a heat conductive element 26, such as a metal plate, and coupled at a second end to a sound chamber 28.

Electricity is generated by a sound-to-energy converter 16, which may be in the form of an electro-mechanical transducer such as a piezoelectric transducer, from the sound created inside a sound chamber 28. The sound chamber 28 defines an interior acoustic chamber 29 within which sound produced by the acoustic devices 21-25 forms and resonates. The acoustic chamber is generally cylindrical in shape and has an end opposite the transducer 16 that is in fluid communication with each open end of each resonating acoustic device 21-25. Thus, the acoustic chamber 29 is larger than each of the individual interior chambers of the acoustic devices 21-25. The heat energy 12 is injected into the system by conduction or direct contact to the upper plate 26 of the energy converter 10. A heat sink 30 is provided to help maintain the cold side of the resonators 21-25 at ambient temperature. In order to convert the electricity generated from the energy converter 16 to useful energy, a transformer 32 is electrically coupled to the energy converter 16. A diode bridge or bridge rectifier 34 is provided to convert an alternating current input into a direct current output. The electricity may be stored in a supercapacitor 14 to power a light 36 or some other electrical appliance that is operated by a switch 38.

Figure 2:
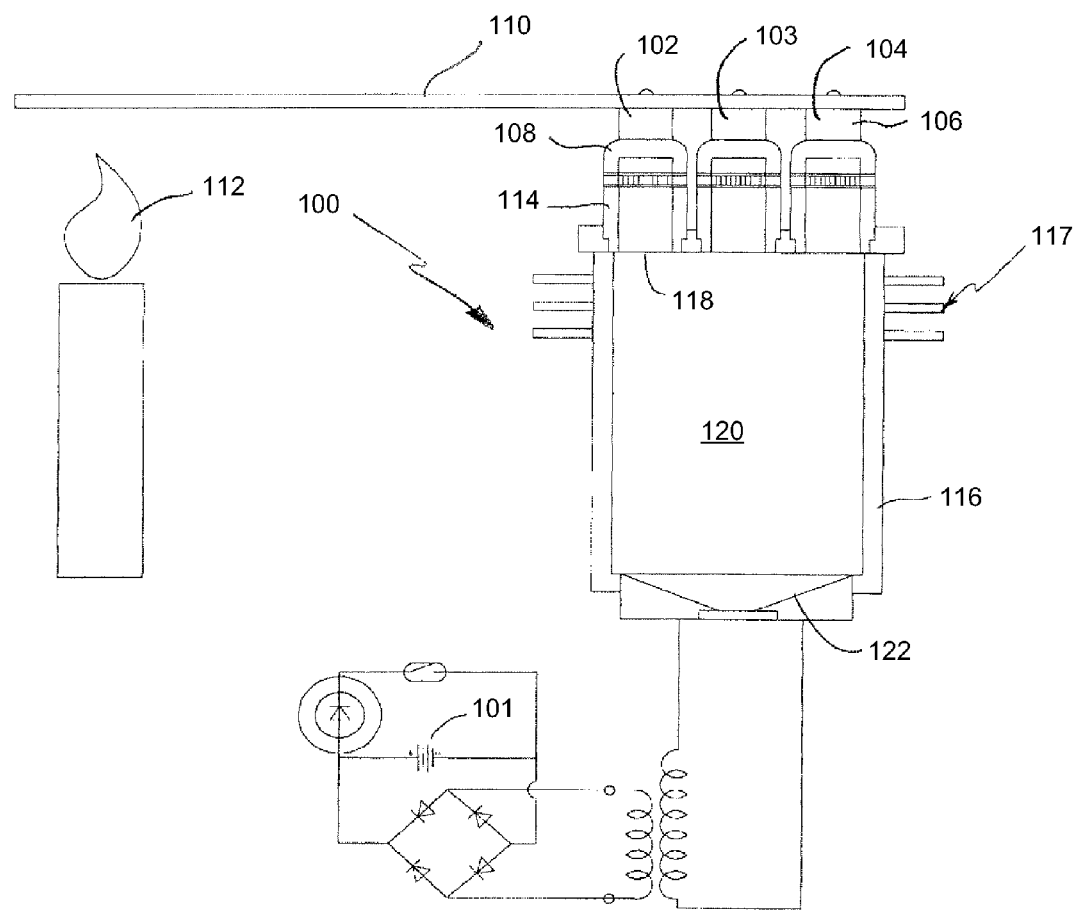
FIG. 2 is a schematic a side plan view of the structural components and a schematic representation of the electrical circuitry of another illustrative embodiment of a thermoacoustic energy converter in accordance with the principles of the present invention.

Referring now to FIG. 2, there is illustrated another embodiment of a thermoacoustic energy converting system, generally indicated at 100, in accordance with the principles of the present invention. The system is configured similarly to the system 10 previously described, but is coupled to a battery 101 for storage of electrical energy generated by the system 100. As further illustrate in FIG. 2, each thermoacoustic device 102-104 is comprised of a coupling structure 106 for mounting the first end 108 of the resonator to a structure 110 conducting heat from a heat source 112. Thus, the first end 108 forms a hot side of each resonator. Each resonator 102-104 also includes a cold side 114 that is coupled to an acoustic chamber structure 116. The acoustic chamber 116 is maintained at ambient temperature with a plurality of heat sinks 117. The open ends 118 of each resonator 102-104 are in fluid communication with the acoustic cavity 120. Thus, sound waves emanating from the open end 118 of each resonator 102-104 will enter the acoustic cavity 120 causing actuation of the piezoelectric driver 122 to produce electricity.

Figure 3:
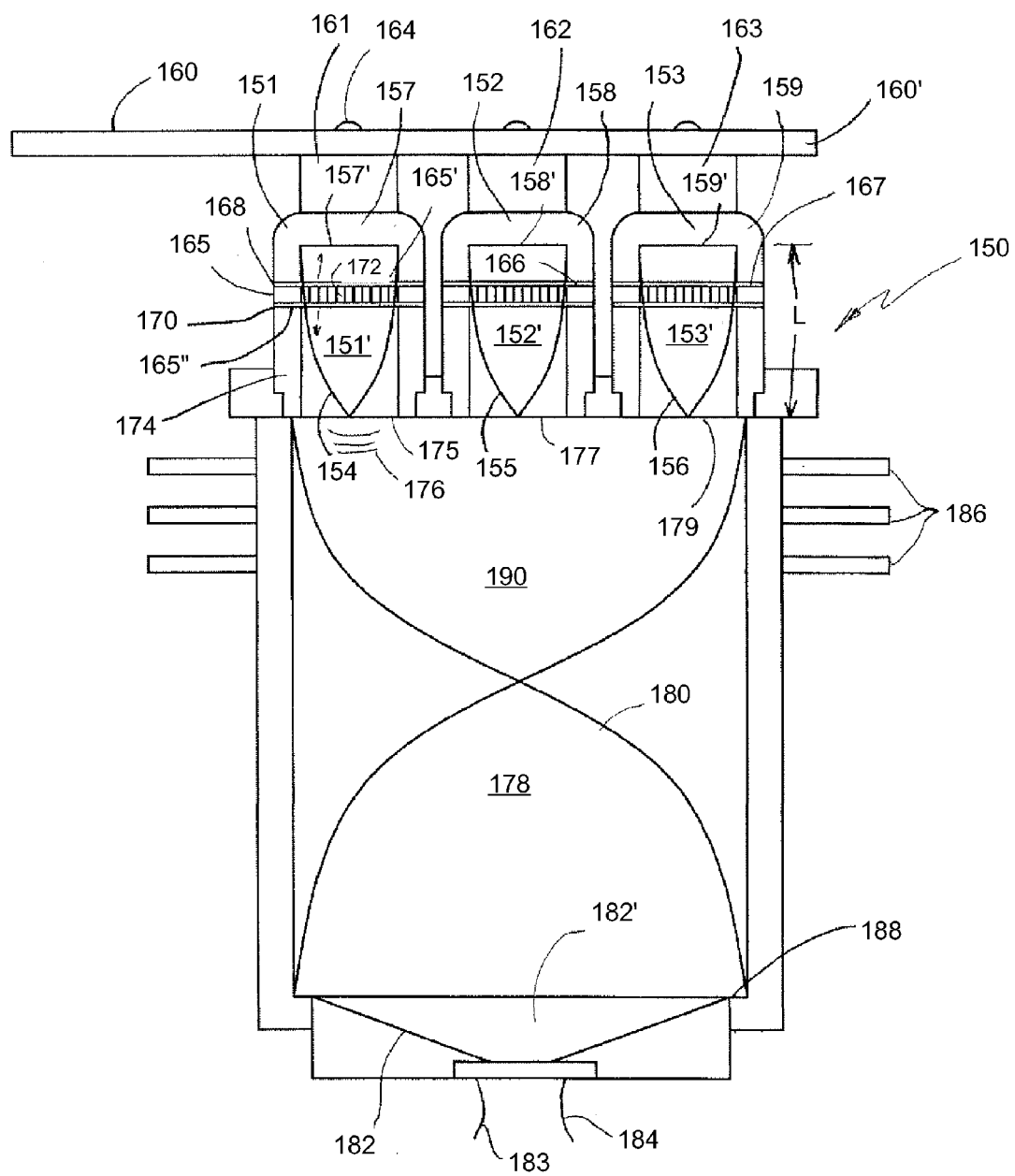
FIG. 3 is a schematic, cross-sectional, side plan view of another embodiment of a thermoacoustic energy converter in accordance with the principles of the present invention.

As illustrated in FIG. 3, each thermoacoustic resonator 151, 152 and 153 of the energy converter 150 according to the present invention generates a standing wave 154, 155 and 156, respectively, when the hot side 157, 158 and 159 of each resonator 151, 152 and 153, respectively, is heated by a source 160 of heat. The heat source 160 may be thermally coupled to other structural components of other systems (not shown) that generate heat, such as electrical systems, integrated circuits, microprocessors or any other components or systems that create heat. The heat is conducted through the heat source 160, in this case a metal plate 160', through the thermal coupling mechanisms 161, 162 and 163, comprised of cylindrical members attached to the plate 160' with threaded fasteners such as threaded fastener 164, and into each the proximal ends of each resonator 151, 152 and 153.

The standing waves 154, 155 and 156 generated in each resonator 151, 152 and 153 may be half waves or quarter waves depending on the length L of the resonator chamber 151', 152' and 153' of each resonator. Each resonator 151, 152 and 153 is comprised of a stack 165, 166 and 167. Each stack, such as stack 165, is comprised of a hot heat exchanger 168, a cold heat exchanger 170 and a stack material 172 disposed between and in thermal contact with each heat exchanger 168 and 170. The stack material may comprise cotton wool, glass wool, steel wool, aerogel, other fibrous materials, a series of perforated plastic plates or a plurality of longitudinally aligned nanotubes. The optimum spacing between the randomly arranged fibers in the stack 165, when a fibrous stack is utilized, may be determined by the thermal penetration depth for the working fluid or gas 190, such that the acoustic field can interact thermally with each element of the stack 165. Typical volume-filling factors for stack 165 may be from about 1% to about 2%. The stack 165 is positioned within the resonator chamber 151' at a distance from the distal end 175 where the greatest pressure gradient across the stack 165 is achieved. The hot heat exchanger 168 is thermally coupled to the hot end 157 of the resonator 151 and thermally isolated from the cold heat exchanger 170 and cold end 174. The cold heat exchanger 170 is thermally anchored to a fixed temperature, usually ambient temperature. Both heat exchangers 168 and 170 may be formed as a thin screen which is effectively acoustically transparent, but that maintains a fixed temperature at each end of the stack 165. The heat exchangers 168 and 170 may be formed from laser patterned copper or aluminum. Thus the thermoacoustic energy converter 150 is comprised of a plurality of resonators 151, 152 and 153, each having a first closed end 157', 158' and 159', a second open end 175, 177 and 179 and defining a resonator chamber 151', 152' and 153'. The stack 165 is disposed within the resonator chambers 151', 152' and 153', The acoustic chamber 178 is coupled to and in fluid communication with each of the second open ends 175, 177 and 179 of the plurality of resonators 151, 152 and 153. A working fluid 190 is disposed within the resonator chambers 151', 152' and 153' as well as the interior acoustic chamber 178. A electro-mechanical transducer 182, in this case a piezoelectric driver, is coupled to the acoustic chamber 178 and has a face 182' in fluid communication with the working fluid 190 such that vibrations imparted by the resonators 151, 152 and 153 to the working fluid 190 cause the electro-mechanical transducer 182 to generate electricity. The stack 165 has a first side 165' and a second side 165" with the stack 165 being disposed within the resonator 151. A temperature gradient is formed between the first and second sides 165' and 165". The heat exchanger 168 is positioned adjacent the first side 165' of the stack 165 and the heat exchanger 170 is disposed adjacent to the second side 165" of the stack 165. The acoustic cavity or chamber 178 is in fluid communication with the second open ends 175, 177 and 179 of the resonators 151, 152 and 153. The acoustic cavity 178 reflects and amplifies at least a portion of the sound waves 176 back towards the first ends 157' 158' and 159' of the resonators 157, 158 and 159 such that the acoustic chamber 178 reflects and amplifies at least a portion of the sound waves 176 generated by the resonators 151, 152 and 153 back toward the first ends 157', 158' and 159' of each of the resonators 151, 152 and 153.

The resulting temperature gradient across the stack 172 creates a standing acoustic wave 154 within the resonator chamber 151'. The working fluid 190, such as air, helium, argon, combinations thereon or other known gases is disposed within the resonator and acoustic chambers 151', 152', 153' and 178. The working fluid 190 allows the standing waves 154, 155 and 156 to form.

Thus, each thermoacoustic device 151, 152 and 153 is comprised of two sections defining a hot side and a cold side. Each section of the thermoacoustic device has a heat exchanger thermally anchored to its end adjacent the stack. The stack 165, formed from a porous, high surface area material, is thermally anchored to each heat exchanger by abutting therewith. The stack material is configured to be able to maintain a temperature gradient. A temperature gradient along the stack is achieved and maintained by injecting heat to the hot side of the resonators and maintaining the cold side of the resonator at a fixed temperature, such as room temperature or other ambient temperature. A thermal heat sink 186 is provided to maintain the cold side at ambient temperature.

Because the distal end 175 of the resonator chamber 151' is open, sound waves 176 emanating from the distal end 175 can enter an acoustic cavity or chamber 178. The sound waves 176 from each resonator 151, 152 and 153 combine within the chamber 178 to create phase-locked sound waves 180 that are directed to and impinge upon the piezoelectric transducer 182. When the transducer 182 is actuated, electrical current is generated and sent through the electrical leads 183 and 184 of the transducer 182 to an electrical circuit as previously described herein. The transducer 182 is generally disposed parallel to and aligned generally coaxially with the stacks of the plurality of resonators The energy converter 150 is configured to operate from the mid-audio frequency range to the ultrasonic range (e.g., from about 2 to 2.6 kHz to about 24 kHz and higher frequencies). In these frequency ranges, advantage is taken of the high sensitivity of piezoelectric devices and their compactness. An electric type of transducer, such as a piezoelectric device, for sound to electricity conversion is superior to an electromagnetic type when operated at high frequencies and when compactness is an issue, as in the miniaturization of devices. Since the thermoacoustic devices are resonant systems, their size determine the resonant frequency, and hence by miniaturizing them, the operating frequency is raised accordingly. The choice of device size is determined by the application and by how much power needs to be converted. Units consisting of arrays offer the possibility of dealing with large power levels which maintain compactness and offer lightweight systems.

Performance of the system of the present invention is determined by operating conditions, mainly the temperature difference imposed by the source of heat driving the system. The amount of heat and the resulting temperature difference will determine the power output, its efficiency and onset for oscillation. The larger the heat input, the higher the sound level will be in the resonator resulting in greater electrical generation.

In an array of thermoacoustic devices according to the present invention, the thermoacoustic devices should be "phase-locked." That is, because the operating frequency of each individual thermoacoustic device may be slightly different, their resulting phases will also be slightly different, depending on the initial conditions for onset of oscillation. In a self-sustained oscillator, the initial phase is usually arbitrary. Thus, an array phase-locking allows the system to achieve maximum power output. Phase-locking of the individual thermoacoustic devices is achieved by the addition of the acoustic chamber of the present invention which provides coupling for in-phase motion of all the acoustic units. When such phase-locking is achieved, the power output depends directly on the number of thermoacoustic devices in the array and maximum power output is achieved.

The energy converter of the present invention is a device which has essentially no moving parts (other than the gas in the resonator and sound chamber and the flexing of the piezoelectric device). The gas may be comprised of air, but may also be helium, gas mixtures or argon and helium, or other gases known in the art. In addition, the working gas may be pressurized for higher power density.

By operating in the mid-audio and low ultrasonic frequency ranges, the thermoacoustic devices are relatively small and can be easily pressurized to high pressure levels. In accordance with the principles of the present invention, the thermoacoustic devices can be pressurized to pressures such as 100 atmospheres and higher without problems related to strength of materials.

The resonator 151 determines the frequency of the thermoacoustic engine. It does this by setting up a standing wave 154 from acoustic pulses generated by the temperature gradient along the stack 165. The resonator 154 provides positive feedback at the stack 165 which sustains the acoustic oscillations. The resonator 151 may be of a one quarter, one half or other wavelength type. In the case of a one quarter wavelength resonator, the cold end is open. Because there is a difference in impedance at the open end between the resonator 151 and the acoustic chamber 178, the acoustic wave is reflected back into the resonator chamber 151', thus setting up the standing wave 154. Quantatively, the standing wave 154 is described by the standing wave ratio. This may be reduced as the diameter of the resonator is increased relative to the length leading to a larger amount of traveling component which is radiated out. A large resonator diameter may be used to provide a large output since the level of generated sound depends on the cross-sectional area of the stack 165. A high standing wave ratio may favor a lower temperature difference for the onset of oscillations because more positive feedback is provided by the reflected wave. Hence, a wide, short resonator will require a large temperature difference across the stack 165 for onset of oscillation unless more gain is provided for positive feedback. The resonator 151 is essentially a storage element where acoustic energy is built up for providing the positive feedback and for generating the sound which will activate the electrical generator 182. It also provides spatial acoustic phasing for the location of the stack 165 inside the resonator chamber 151' for optimum performance in sound production. The only "moving part" in the device of this invention is the working gas (generally depicted by arrows on either side of the stack 165 in the resonator 151 which oscillates at the acoustic frequency determined by the resonator.

Another reason for a wide resonator is that the stored acoustic energy is large in comparison with viscous and thermal losses within a characteristic surface layer inside the resonator. The acoustic cavity 178 is used to increase the positive feedback in the system. This is particularly important when the standing wave ratio in the resonator 151 is low, which occurs when the quarter wave resonator is wide but short. The cavity 178 acts as a reflector which can be non-resonant or resonant. The latter case may lead to the highest increase in positive feedback to the resonator 151. Ideally the cavity 178 should be on resonance at or near resonance with the resonator 151. Another advantage of the use of the acoustic chamber 178 is that its quality factor or "Q" may be used to enhance the feedback, depending on geometrical factors. An important consequence of increased positive feedback from the chamber 178 is a reduction in the critical temperature difference across the stack 165 for the onset of oscillation. This may prove especially advantageous compared to prior devices, as only a low temperature difference may be available for certain applications. It will be appreciated that the distal end 188 of the chamber 178 is a convenient location for disposing the electrical generator 182, in this exemplary embodiment a piezoelectric driver, which converts the sound to energy. Depending on the particular application, the shape of cavity 178 may be cylindrical in cross-section, have a tapered cylindrical cross-section, be Helmholtz-like or any other advantageous geometrical shape.

The heat-to-electricity generating system 150, of the present invention may incorporate various approaches to inject heat to the hot heat exchanger 168. A flame or a heating element can be used as the source of heat. Heat is injected to the system 150 by direct heating of the hot heat exchanger 168 or by heating the hot section 157 of the resonator 151 to which the hot heat exchanger 168 is thermally anchored. Heat from other sources, such as waste heat from a mechanical or electronic device, can be injected to the hot heat exchanger 168 by metallic thermal conduction, as depicted in FIG. 1. Similarly, an appropriate radioisotope containing element may be used to inject heat to the hot heat exchanger 168, again by metallic thermal conduction.

The electrical generator 182 may be a piezoelectric element in a monomorph configuration or bimorph configuration. Each piezoelectric element ("piezo") is a capacitor offering high impedance for current extraction. Electrical generator 182 may be tuned to the resonance of the resonator 151 to maximize electric output. Because the electrical generator 182 is a pressure sensitive unit, optimal performance may be achieved by positioning the generator 182 at the location of maximum acoustic pressure, typically, at the distal end 188 of chamber 178 opposite the thermoacoustic resonators 151, 152 and 153.

Electrical power output may be maximized when the electrical generator 182 is in resonance with the acoustic system 150 device. The electric voltage obtained may be enlarged by configuring the generator 182 in a bimorph mode, where two piezos attached to a metallic membrane are connected in series; such piezos may appear as a bimetallic strip to provide maximum voltage output when exposed to sound power.

A system 150 in accordance with the present invention may be miniaturized for operation in the frequency range of from about 2 kHz to about 24 kHz. Used in arrays, such systems may be configured to work in the ultrasonic range at 40 kHz, as for military power applications. High power densities may be achieved by pressurizing the working fluid 190. Such miniature thermoacoustic energy converters may work up to frequencies as high as the ultrasonic range. Operation with a low threshold in temperature difference for oscillation may make such systems useful for a variety of applications.

Used in arrays, systems 150 of the present invention may be useful in any number of applications. For example, such systems may be thermally attached to a waste heat producing electronic or mechanical device, such as a radar system or high powered electronic devices. The waste heat will drive the system 150 and be thereby converted to electricity. In other applications, an array of systems 150 may be used as a portable source of electric power. For example, heat from a flame may be used to activate the unit and make electrical power available for application. Such a system would be useful in an emergency or battlefield situation. A typical array may consist of about 100 systems 10 (shown in FIG. 1) or systems 150 (shown in FIG. 3) may be linked in parallel between a cold plate thermally anchored to ambient temperature and a hot plate where heat is injected. It is anticipated that using air at 1 atmosphere, such a structure could provide about 7.5 watts and about 150 watts at 20 atmospheres. Any desired or advantageous number of systems 150 in such an array may be phase locked and share a single cavity 178 with a single generator 182. For example, all 100 systems may share a single cavity, or multiples of 10, 20, or 25 units may share a single cavity.

In order that the present invention be best understood, a quantitative description of the how devices in accordance with the present invention will now be presented. Typically, heat flow between air parcels in the sound field and each element of the stack takes place across a thermal penetration depth $\delta_x$ which is determined by the thermal properties of the gas, and the acoustic frequency. This distance is defined as:

$$\delta_k = \left(\frac{2\kappa}{\omega}\right)^{1/2}$$

where $\omega$ is the acoustic angular frequency and $\kappa$ is the fluid's thermal diffusivity. With air at one atmosphere, $\delta_\theta = 44$ μm at 5 kHz. This characteristic dimension $\delta_\kappa$ is a guide for determining the spacing between the elements of the stack, i.e. they should be separated about $2\delta_\kappa$ to $3\delta_\kappa$ spaces apart.

Heat flow along the stack can be written as:

$$\dot{Q}_2 = -\frac{1}{4}\Pi\delta_k T_m \beta p_1 u_1 (\Gamma - 1)$$

where $\beta$ is the fluid coefficient of thermal expansion, $T_m$ is the mean temperature, $p_1$ is the amplitude of acoustic pressure oscillations, $u_1$ is the corresponding air particle speed of the sound field, $\Pi$ is the perimeter around each stack element times the number of such elements and $\Gamma$ is the ratio of temperature gradient along the stack normalized to a critical temperature gradient. The resultant work flow is given by:

$$\dot{W}_2 = \frac{1}{4}\Pi\delta_k \frac{T_m \beta^2 \omega \Delta x p_1^2}{\rho_m c_p}(\Gamma - 1)$$

where $\rho_m$ is the mean density of the fluid, $C_p$, its specific heat at constant pressure, and $\Delta_x$ is the stack length. The efficiency of this engine can be written as $$\eta = \frac{\dot{W}_2}{\dot{Q}_2}$$

which simplifies to $$\eta = \frac{\eta_0}{\Gamma}$$

where $\eta_c$ is the Carnot efficiency, $$\frac{\Delta T}{T_m},$$

and $\Gamma$ is the ratio of temperature gradient along the stack to a critical temperature gradient $\nabla T_{crit}$ Oscillations will occur when $\Gamma > 1$.

The critical temperature gradient $\nabla T_{crit}$ is the boundary between heat flowing from the stack to air parcels and heat flowing from the air parcels to the stack. It is given by:

$$\nabla T_{crit} = \frac{\gamma - 1}{T_m \beta} \frac{T_m}{\bar{\lambda}} \tan\left(\frac{x}{\bar{\lambda}}\right)$$

where γ=ratio of isobaric to isochoric specific heats
λ=radian wavelength of sound
x=position of stack relative to nearest pressure autinode in resonator As mentioned above $\nabla T_{crit}$ is important because it determines the magnitude of $\nabla T$ for the onset of oscillations, and this occurs for $\Gamma > 1$.

Since the prime mover will be used in energy conversion devices, it is important to estimate the power density of this type of engine. The power per unit volume can be calculated from the heat flow divided by the engine volume (it varies inversely with operating frequency f).

$$\frac{\dot{H}_2}{V} \approx \frac{f}{2} T_m \beta p_m a^2 M^2$$

where a is the speed of sound in the fluid, and M is a kind of Mach number expressing the degree of nonlinear behavior, and it is equal to $P_1/\rho_m a^2$. This equation demonstrates that large power densities can be achieved at high operating frequency and at high mean gas pressures. One of the important features of the present invention is that power densities can be quite high, of order of watts/cm$^3$, and higher, depending on the geometry and working conditions. Since systems in accordance with the present invention are resonant systems, miniaturization can lead to high frequency operation and consequently the device power density may be large. Miniature prime movers, such as the resonators and arrays of the present invention, may be fabricated using MEMS (microelectromechanical systems) technology.

While this invention has been described in certain embodiments, the present invention can be further modified with the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A method of converting energy to electricity with an energy converter, the energy converter including
a resonator having a first end, and a second open end defining a resonator chamber,
an acoustic chamber coupled to and in fluid communication with the second open end, and
an electro-mechanical transducer coupled to the acoustic chamber, the method comprising:
generating a sound wave within the resonator chamber;
working a fluid disposed within the resonator chamber and the acoustic chamber in response to the generating the sound wave;
the acoustic chamber reflecting and amplifying a portion of the sound wave back to the first end;
the working fluid vibrating the electro-mechanical transducer; and
generating electricity in response to the vibration.

2. The method of claim 1, wherein the method further comprises actuating the electro-mechanical transducer in response to the vibration, and wherein the generating the electricity is in response to the actuation.

3. The method of claim 1, wherein the energy convertor includes a stack disposed within the resonator chamber, and wherein the stack initiates the sound wave.

4. The method of claim 3, wherein the stack includes a first heat exchanger disposed on a first side of the stack and thermally coupled to a hot side of the resonator, and a second heat exchanger disposed on a second side of the stack and thermally coupled to a cold side of the resonator, the cold side of the resonator being thermally coupled to the acoustic chamber.

5. The method of claim 3, wherein a face of the electro-mechanical transducer is generally disposed parallel to and is aligned generally coaxially with the stack.

6. The method of claim 1, wherein the energy converter has a plurality of resonators and a thermal coupling mechanism thermally coupled to the plurality of resonators, the plurality of resonators including the resonator, and wherein the method further comprises transferring thermal energy from the thermal coupling mechanism to the plurality of resonators for creating a respective standing wave within each resonator.

7. The method of claim 1, wherein the electro-mechanical transducer is disposed at an end of the acoustic chamber and in fluid communication with the working fluid disposed within the acoustic chamber, and wherein the method further comprises actuating the electro-mechanical transducer by sound, and generating the electricity therefrom.

8. The method of claim 1, wherein each resonator has a generally cylindrical resonator chamber, a tapered cylindrical resonator chamber, or a Helmholtz-like resonator chamber.

9. The method of claim 3, wherein the stack is comprised of a random fiber stack material selected from the group of materials comprised of steel wool, cotton wool and glass wool.

10. The method of claim 1, wherein the working fluid is selected from the group of gases comprising air, an inert gas, and a mixture of inert gases.

11. The method of claim 1, wherein the electro-mechanical transducer is comprised of a piezoelectric element, and wherein the method further comprises actuating the piezoelectric element by sound at frequencies greater than 2000 Hz, and generating electricity therefrom.

12. The method of claim 11, wherein the actuating the piezoelectric element includes actuating at ultrasonic frequencies.

13. The method of claim 4, wherein the heat exchanges are comprised of thermally conductive metal mesh.

14. A method of converting energy to electricity with a thermoacoustic energy converter, the energy converter including
- a heat coupling element,
- a plurality of thermoacoustic resonators coupled to the heat coupling element, each of the resonators having a closed first end and a second open end defining a resonator chamber,
- an acoustic chamber having a first end coupled to and in fluid communication with each of the second open ends of the plurality of resonators, the acoustic chamber having a volume that is greater than the resonator chamber of one of the plurality of resonators,
- a piezoelectric transducer coupled to a second end of the acoustic chamber, the method comprising, comprising:
- the heat coupling element subjecting heat energy to the plurality of resonators;
- each of the resonators generating a respective standing wave with a working fluid in response to the subjecting the heat energy;
- the working fluid vibrating the piezoelectric transducer; and
- generating electricity in response to the vibration.

15. The method of claim 14, wherein the method further comprises actuating the piezoelectric transducer in response to the vibration, and wherein the generating the electricity is in response to the actuation.

16. The method of claim 15, wherein each of the plurality of resonators comprises a first heat exchanger disposed on a first side of a stack included in the resonator and thermally coupled to a hot side of the resonator, and a second heat exchanger disposed on a second side of the stack and thermally coupled to a cold side of the resonator, the cold side of the resonator being thermally coupled to the acoustic chamber.

17. The method of claim 16, wherein a face of the piezoelectric transducer is generally disposed parallel to and is generally aligned coaxially with the stacks of the plurality of resonators.

18. The method of claim 14, the method further comprising actuating the piezoelectric element by sound at frequencies greater than 2000 Hz, and generating electricity therefrom.

19. The method of claim 18, wherein the actuating the piezoelectric element includes actuating at ultrasonic frequencies.

* * * * *